(12) United States Patent
Viebach et al.

(10) Patent No.: US 11,916,464 B2
(45) Date of Patent: Feb. 27, 2024

(54) HYBRID TRANSMISSION DEVICE

(71) Applicant: Magna PT B.V. & Co. KG, Untergruppenbach (DE)

(72) Inventors: Richard Viebach, Bad Friedrichshall (DE); Matthias Pruy, Leonberg (DE)

(73) Assignee: Magna PT B.V. & Co. KG, Untergruppenbach (DE)

(*) Notice: Subject to any disclaimer, the term of this patent is extended or adjusted under 35 U.S.C. 154(b) by 72 days.

(21) Appl. No.: 17/689,310

(22) Filed: Mar. 8, 2022

(65) Prior Publication Data

US 2022/0329137 A1 Oct. 13, 2022

(30) Foreign Application Priority Data

Apr. 8, 2021 (DE) .......................... 102021203495.0

(51) Int. Cl.
*H02K 7/08* (2006.01)
*H02K 1/28* (2006.01)
(Continued)

(52) U.S. Cl.
CPC ............ *H02K 7/083* (2013.01); *H02K 1/28* (2013.01); *H02K 3/12* (2013.01); *H02K 7/003* (2013.01);
(Continued)

(58) Field of Classification Search
CPC ...... H02K 15/028; H02K 15/00; H02K 15/14; H02K 7/085; H02K 7/003; H02K 7/083;
(Continued)

(56) References Cited

U.S. PATENT DOCUMENTS

| | | | |
|---|---|---|---|
| 2011/0073389 A1* | 3/2011 | Lamke | H02K 7/083 903/902 |
| 2011/0095634 A1* | 4/2011 | Lamke | H02K 7/006 310/91 |

(Continued)

FOREIGN PATENT DOCUMENTS

| | | |
|---|---|---|
| DE | 102008002441 A1 | 12/2009 |
| DE | 102008002443 A1 | 12/2009 |

(Continued)

OTHER PUBLICATIONS

Machine translation of DE 102016112426 A1 (Year: 2018).*

*Primary Examiner* — Stacey A Fluhart
*Assistant Examiner* — Farhana Pervin
(74) *Attorney, Agent, or Firm* — Dickinson Wright PLLC (57) ABSTRACT

A hybrid transmission device, comprising an electric machine, wherein the electric machine has an externally situated stator and an internally situated rotor shaft, wherein the hybrid transmission device furthermore comprises a transmission in a transmission housing and a clutch in a clutch housing, wherein the stator is fastened in the transmission housing, wherein the rotor shaft has, at a first end, a pinion that meshes with an intermediate gear of the transmission, wherein the rotor shaft is mounted in the region of the first end and in the region of the oppositely situated second end of the rotor shaft by means of a first and a second bearing, wherein an intermediate plate fastened to the stator is arranged axially in the region of the first end of the rotor shaft, wherein the second bearing for the mounting of the second end of the rotor shaft is fixed directly in the clutch housing, and the first bearing for the mounting of the first end of the rotor shaft is fixed to the transmission housing or is fixed to the intermediate plate, and a method for assembling a hybrid transmission device of said type.

13 Claims, 5 Drawing Sheets

(51) Int. Cl.
*H02K 3/12* (2006.01)
*H02K 7/00* (2006.01)
*H02K 7/116* (2006.01)
*H02K 15/02* (2006.01)
*B60K 6/48* (2007.10)

(52) U.S. Cl.
CPC .......... *H02K 7/116* (2013.01); *H02K 15/028* (2013.01); *B60K 2006/4825* (2013.01)

(58) Field of Classification Search
CPC .......... H02K 7/116; H02K 7/108; H02K 7/10; H02K 7/1163; H02K 1/28; H02K 3/12; H02K 3/28; H02K 7/00; H02K 7/006; H02K 7/02; H02K 7/08; H02K 7/11; H02K 7/12; H02K 17/32; H02K 23/68; H02K 27/30; H02K 49/00; H02K 49/02; H02K 49/04; B60K 2006/4825; B60K 6/38; B60K 6/40; B60K 6/405; B60K 6/26; B60K 6/36; F16H 57/021; F16H 57/023; F16H 2057/005; F16H 2057/0056; F16H 2057/02034; F16H 2057/0216; Y02T 10/62

See application file for complete search history.

(56) References Cited

U.S. PATENT DOCUMENTS

| | | | |
|---|---|---|---|
| 2012/0125149 A1* | 5/2012 | Palfai | F02N 15/067 310/83 |
| 2019/0186622 A1* | 6/2019 | Ishikawa | H02K 7/083 |
| 2020/0244138 A1* | 7/2020 | Fröhlich | H02K 7/10 |
| 2020/0336042 A1* | 10/2020 | Ramirez, Jr. | H02K 7/1028 |
| 2021/0086854 A1* | 3/2021 | Jung | H02K 15/00 |
| 2022/0016968 A1* | 1/2022 | Inda | F16H 57/0476 |

FOREIGN PATENT DOCUMENTS

| | | |
|---|---|---|
| DE | 112005002200 B4 | 4/2011 |
| DE | 102016112426 A1 | 1/2018 |
| EP | 3772802 A1 | 2/2021 |

\* cited by examiner

Fig. 5

HYBRID TRANSMISSION DEVICE

CROSS-REFERENCE TO RELATED APPLICATIONS

This application claims priority to German Application No. DE 102021203495.0, filed on Apr. 8, 2021 at the German Patent Office and which is hereby incorporated by reference in its entirety.

FIELD OF THE INVENTION

The present invention relates to a hybrid transmission device comprising an electric machine and a transmission, and further relates to a method for assembling such a hybrid transmission device.

BACKGROUND OF THE INVENTION

This section provides information related to the present disclosure which is not necessarily prior art Hybrid electric vehicles, also referred to as hybrid vehicles, are nowadays well-known and use at least one electric machine and an additional drive, commonly an internal combustion engine, for the propulsion of the vehicle. In the case of a parallel hybrid drive, the electric motor and the internal combustion engine can impart their drive torques to the drivetrain simultaneously. Different architectures are known for the arrangement of the electric machine, of the internal combustion engine and of the transmission of a parallel hybrid vehicle. In the case of a so-called P2.5 arrangement, the electric machine is commonly located in a dual clutch transmission on an input shaft of a sub-transmission.

An electric machine installed in a transmission in accordance with a P2.5 application, such that the electric machine is connected to one partial transmission, has previously been used as an independent preassembled module, wherein the module of the electric machine comprises not only a rotor and a stator but also two end shields for the mounting of the rotor shaft.

If the free end of the rotor shaft has a pinion, the mounting of the rotor shaft in the end shield is commonly such that the pinion is arranged in an axial direction "behind" or "outside" the bearing on this side of the rotor shaft (so-called "overhung mounting").

The entire preassembled electric machine module can then be screwed, for example by way of screw attachment bosses on an end shield, into a transmission housing.

In the case of this construction, to accommodate the rotor shaft bearings, the module of the electric machine must have two end shields that are connected to the stator. This results in an additional structural space requirement in a radial and axial direction of the electric machine module. Furthermore, the present independent module is made heavier by the weight of the end shields. Owing to the overhung mounting of the rotor of the electric machine, the bearing at the free end of the rotor shaft must be of larger dimensions than would be the case if the bearing were arranged "behind" the pinion. Also, owing to the overhung mounting, a greater degree of tilting of the pinion occurs during operation under load than would be the case if said bearing were arranged "behind the pinion". This tilting results in undesired acoustic conspicuities (NVH—noise, vibration and harshness). The end shields, and likewise the relatively large bearing, also entail high costs.

SUMMARY OF THE INVENTION

This section provides a general summary of the disclosure, and is not intended to be interpreted as a comprehensive disclosure of its full scope or all of its features.

It is an object of the invention to improve a hybrid transmission device of the stated type with regard to at least some of the stated disadvantages, and in particular to specify a hybrid transmission device that has a smaller structural space requirement, lower weight and lower costs. It is furthermore sought to specify an efficient and inexpensive method for assembling such a hybrid transmission device which is suitable for mass production.

This and other objects are achieved by means of a hybrid transmission device comprising an electric machine, wherein the electric machine has an externally situated stator and an internally situated rotor shaft, wherein the hybrid transmission device furthermore comprises a transmission in a transmission housing and a clutch in a clutch housing, wherein the stator is fastened in the transmission housing or in the clutch housing, wherein the rotor shaft has, at a first end, a pinion that meshes with an intermediate gear of the transmission, wherein the rotor shaft is mounted in the region of the first end and in the region of the oppositely situated second end of the rotor shaft, wherein an intermediate plate is arranged axially in the region of the first end of the rotor shaft, wherein the stator is fastened to the intermediate plate, wherein the second bearing for the mounting of the second end of the rotor shaft is fixed directly in the clutch housing, and the first bearing for the mounting of the first end of the rotor shaft is fixed directly to the transmission housing or is fixed to the intermediate plate.

According to the invention, an electric machine module that can be inserted into a transmission is produced without end shields. The rotor shaft is mounted at two bearings, wherein one of the bearings, specifically the second bearing, which is situated at that end of the rotor shaft which does not bear the pinion, is fixed, that is to say fastened rotationally fixedly, directly in a housing component, specifically in the clutch housing, of the hybrid transmission device. The other bearing, the first bearing, is either likewise fastened directly in the housing, specifically in the transmission housing, or is fastened in an intermediate plate, which itself in turn serves for the fastening of the stator and is preferably also screw-connected in the transmission housing. The intermediate plate is preferably a substantially circular plate that stands normally with respect to the rotor shaft and, at the inside, has a preferably likewise circular recess through which the motor shaft extends. It is preferably also the case that a shaft stub is formed, integrally or by rotationally fixed fastening, on said intermediate plate, on which shaft stub there is mounted an intermediate gear that meshes with the pinion of the rotor shaft.

The rotor shaft is thus mounted, at least at one end or at both ends of the rotor shaft, directly in the housing of the hybrid transmission device. At least one end shield can thus be omitted. An intermediate plate can be equipped with various additional components, and can have at least the shaft stub for the mounting of the intermediate gear, and thus be used for multiple purposes, for example also for the mounting of the rotor shaft, of a rotor position sensor and/or of a rotor earthing ring.

The electric machine is thus fully integrated into the transmission, preferably in a P2.5 architecture. A method for installing the electric machine into the transmission, which method is suitable for mass production, is thus made possible, wherein the rotor of the electric machine is mounted directly in the two housing halves without the rotor and stator making contact in a damage-inflicting manner during the installation process.

By means of this mounting without end shields, it is possible for advantages to be achieved with regard to a cost saving as a result of an omission or removal of components, shortening of tolerance chains, structural space optimization, weight reduction, optimization of the toothing tilting under load, and thus NVH optimization, and downsizing potential for the rotor bearing arrangement.

The expressions "transmission housing" and "clutch housing" can refer to two parts, in particular two halves, of a common housing.

The pinion at the first end of the rotor shaft is preferably situated axially between the first bearing and the second bearing, such that the first bearing is situated to the outside of the pinion of the rotor shaft.

According to one embodiment, a clamping ring is arranged axially in the region of the second end of the rotor shaft, wherein the stator is clamped between the intermediate plate and the clamping ring, preferably in a manner braced by means of tension bolts.

According to a further embodiment, the stator, in particular the stator laminations, may have screw attachment bosses axially in the region of the second end of the rotor shaft, such that the stator is clamped between the intermediate plate and the screw attachment bosses, preferably in a manner braced by means of tension bolts.

A method according to the invention for assembling a hybrid transmission device of said type comprises the steps whereby, firstly, a rotor module that comprises at least the rotor shaft and a rotor laminated core is preassembled, and a stator module that comprises at least one stator laminated core with stator windings is preassembled, the rotor module and the stator module are placed in an axial direction onto a workpiece carrier and are fitted one inside the other in contact-free fashion, such that the rotor module and the stator module preferably do not make contact with one another, wherein the rotor is preferably received rotationally fixedly on the workpiece carrier, the intermediate plate, which preferably comprises the shaft stub for the mounting of the intermediate gear, is mounted on the stator, the rotor module and stator module fitted on the workpiece carrier are assembled with the transmission, the transmission housing is placed over the transmission, and the clutch housing is connected to the transmission housing.

Preferably, before being placed in an axial direction onto the workpiece carrier and being fitted one inside the other in contact-free fashion, the rotor module and the stator module are already temporarily fitted one inside the other such that the rotor shaft can rotate, and at least one test for the purposes of singling out defective parts, for example a rotation test, is performed in order to single out defective parts.

After the transmission housing has been placed over the transmission, the intermediate plate is preferably screwed to the transmission housing.

After the intermediate plate, which comprises the shaft stub for the mounting of the intermediate gear, is mounted on the stator, and preferably before the rotor module and stator module fitted on the workpiece carrier are assembled with the transmission, the intermediate gear and the bearing arrangement thereof are preferably fastened on the shaft stub.

It is preferable if, after the intermediate gear has been fastened on the shaft stub, and preferably before the rotor module and stator module fitted on the workpiece carrier are assembled with the transmission, the first bearing for the mounting of the first end of the rotor shaft is fastened to the rotor shaft. Alternatively, the first bearing may already be fastened in the intermediate plate.

Before the clutch housing is connected to the transmission housing, preferably after the transmission housing has been placed over the transmission, a clamping ring may be attached to the stator axially in the region of the second end of the rotor shaft, wherein the stator is clamped between the intermediate plate and the clamping ring. It is particularly preferable if the stator is braced between the intermediate plate and the clamping ring, or between the intermediate plate and the screw attachment bosses of the stator, by means of multiple tension bolts.

Further advantageous steps of the assembly method are specified in more detail in accordance the description of the figures.

The invention thus describes a method for assembling a hybrid transmission device, which method makes it possible for an electric machine to be mounted by means of one bearing (the second bearing) (hereinafter referred to as variant 1) or both bearings (first and second bearings) (hereinafter referred to as variant 2) directly in a clutch housing (variant 1) or in a clutch and transmission housing (variant 2). It is thus possible for end shields to be omitted or to be made more lightweight and space-saving, for the first bearing to be arranged "behind" the pinion directly in the transmission housing (variant 2), for the tilting of the pinion under load to be minimized as a result of an arrangement of the first bearing behind said pinion (variant 2), which has a positive effect on the bearing size of the first bearing and on the noise characteristics (NVH), and for costs to be saved (variants 1 and 2).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The invention will be described by way of example below with reference to the drawings.

DESCRIPTION OF THE INVENTION

Figure 1:
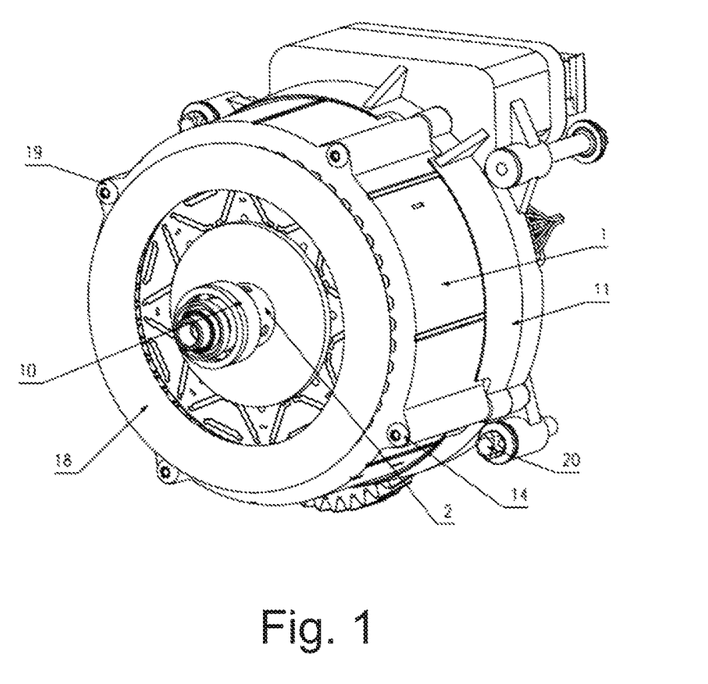
FIG. 1 is a three-dimensional illustration of an electric machine of a hybrid transmission device according to the invention, as viewed from the second end of the rotor shaft.
Figure 2:
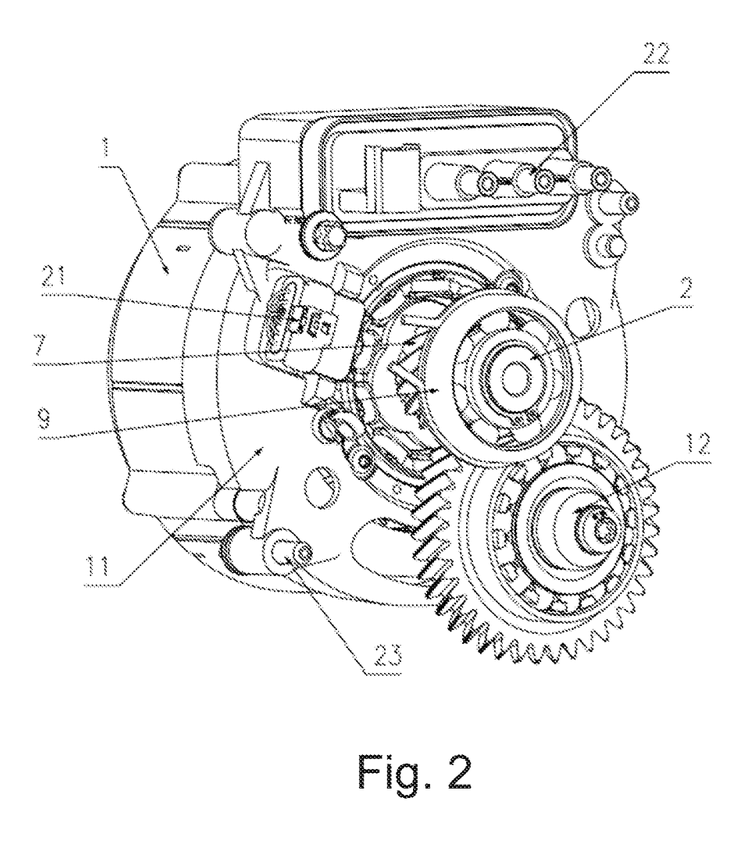
FIG. 2 is a three-dimensional illustration of the electric machine of the hybrid transmission device as per FIG. 1, as viewed from the first end of the rotor shaft.
Figure 3:
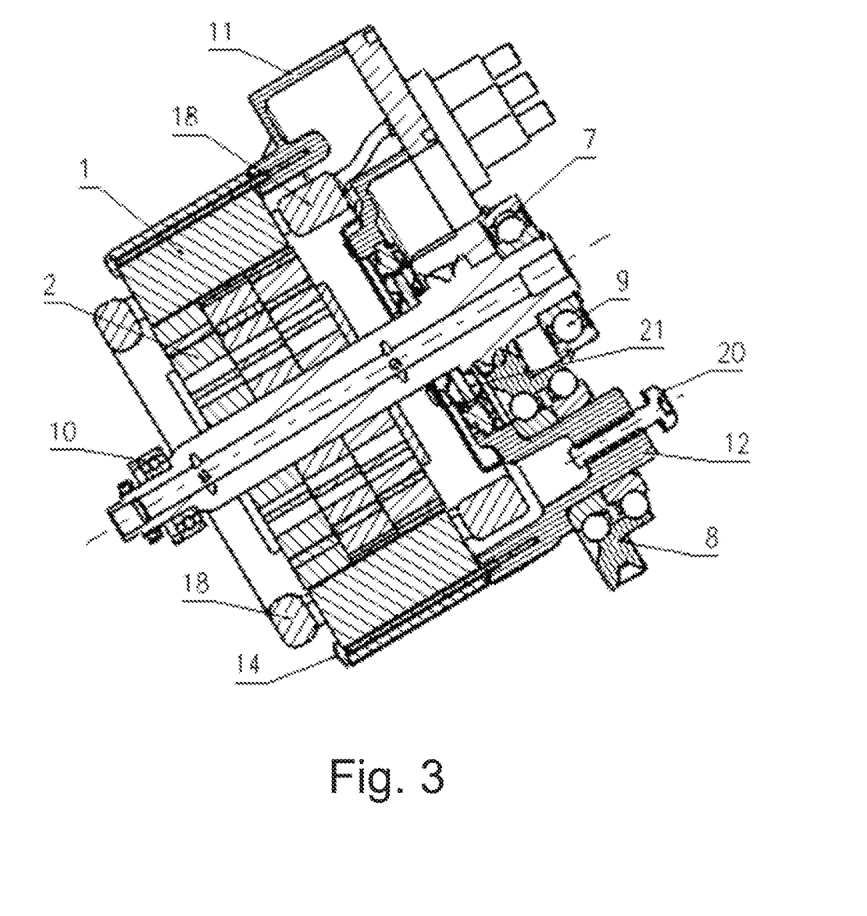
FIG. 3 is a sectional view of the electric machine of the hybrid transmission device as per FIG. 1 from a side elevation.

FIGS. 1-3 illustrate an electric machine of a hybrid transmission device according to the invention—in FIG. 1 as viewed from the side of the second bearing 10, in FIG. 2 as viewed from the side of the first bearing 9, and in FIG. 3 in a section from a side elevation.

The electric machine comprises an externally situated stator 1 and an internally situated rotatable rotor shaft 2. A hybrid transmission device having an electric machine of said type (see FIG. 4) comprises a transmission 3 in a transmission housing 4 and a clutch 5 in a clutch housing 6. The stator 1 is then fastened in the transmission housing 4.

The electric machine and the transmission 3 are arranged in a P2.5 architecture.

Figure 4:
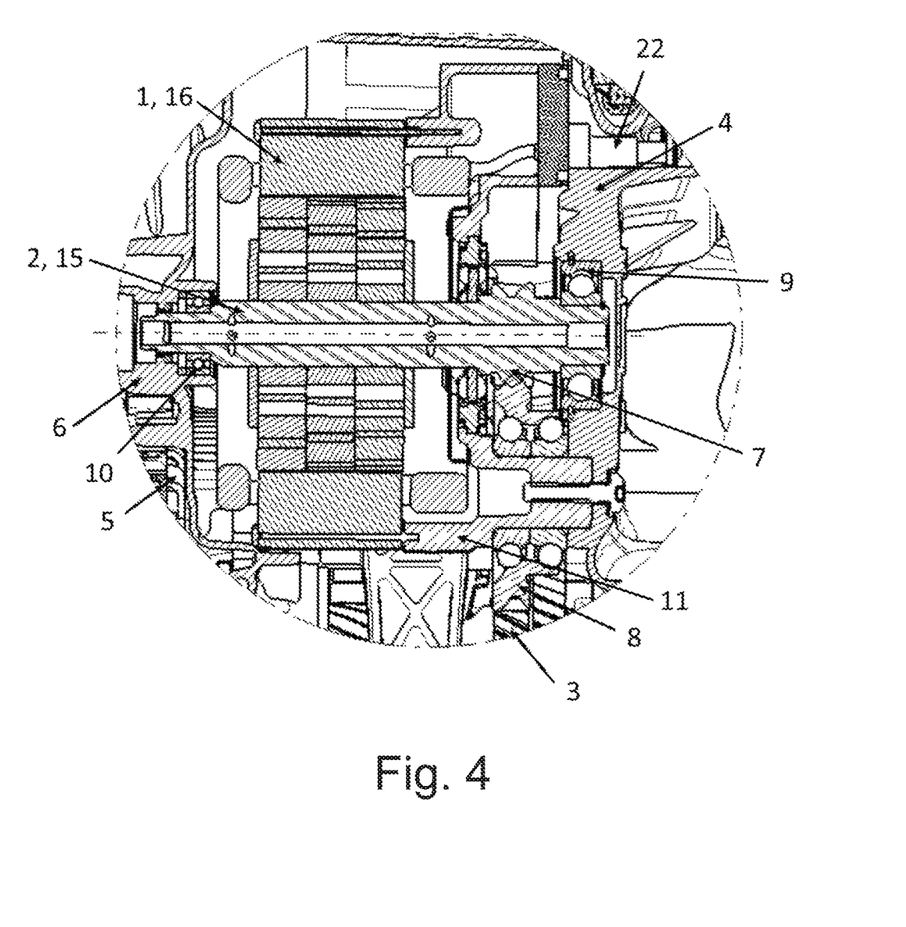
FIG. 4 is a detail sectional view of a hybrid transmission device according to the invention having an electric machine as per FIG. 1.

The rotor shaft 2 has, at a first end, a pinion 7 (FIGS. 2 and 3) that meshes with an intermediate gear 8 of the transmission 3 (FIG. 4 and FIG. 3). The rotor shaft 2 is mounted by means of a first and a second bearing 9, 10 in the region of the first end and in the region of the oppositely situated second end of the rotor shaft 2.

An intermediate plate 11 fastened to the stator 1 is arranged axially in the region of the first end of the rotor shaft 2 (FIG. 2).

The second bearing 10 for the mounting of the second end of the rotor shaft 2 is fixed directly in the clutch housing 6, and the first bearing 9 for the mounting of the first end of the rotor shaft 2 is fixed to the transmission housing 4 (FIG. 4) or is fixed to the intermediate plate 11. The intermediate plate 11 is screw-connected in the transmission housing 4.

The intermediate gear 8 is mounted on a shaft stub 12, wherein the shaft stub 12 is formed on the intermediate plate 11 (FIGS. 2 and 3).

It is illustrated in FIGS. 2 and 3 that the pinion 7 is situated at the first end of the rotor shaft 2 axially between the first bearing 9 and the second bearing 10, such that the first bearing 9 is situated to the outside of the pinion 7 of the rotor shaft 2.

Also fastened to the intermediate plate 11 are the static part of a resolver 21 and AC phase terminals 22 of the electric machine. The intermediate plate 11 is screwed to the transmission housing 4 by means of fastening screws 23.

FIG. 1 shows that the stator 1 is clamped between the intermediate plate 11 and the screw attachment bosses 19 of the stator laminations, by virtue of the intermediate plate 11 and the screw attachment bosses 19 being braced by means of multiple circumferentially distributed tension bolts 14—in particular screws. The tension bolts 14 run through the screw attachment bosses 19 of a clamping ring or of the stator 1 and into fastening points, which are respectively assigned to the screw attachment bosses 19, on the intermediate plate 11. The intermediate plate 11 also has fastening screws 23 for the screw connection of the intermediate plate 11 to the transmission housing 4.

The winding head 18 of the stator 1 is also visible in FIG. 1 at the second end of the rotor shaft.

Figure 5:
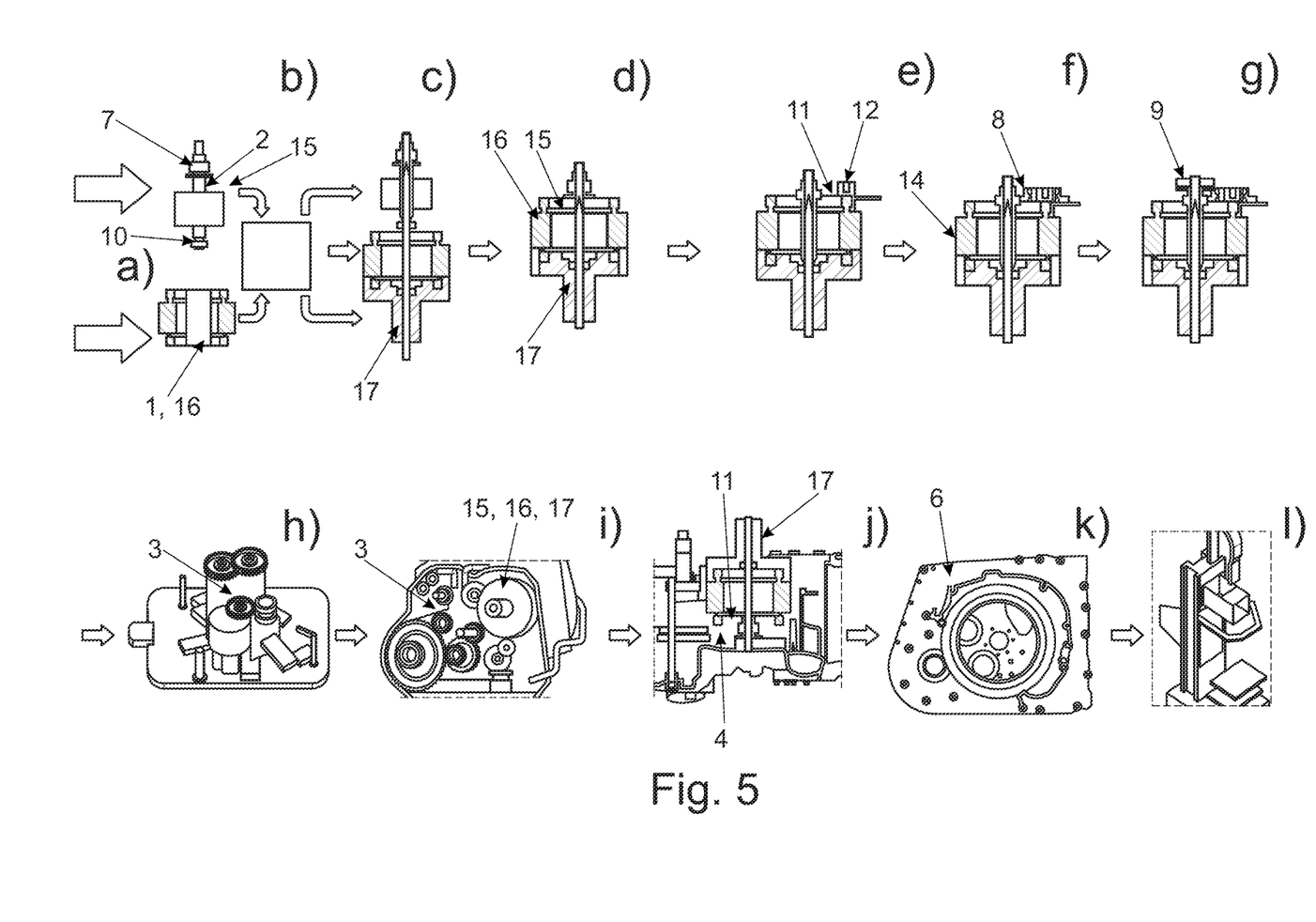
FIG. 5 is a schematic illustration of steps of a method according to the invention for assembling a hybrid transmission device as per FIG. 4.

FIG. 5 schematically illustrates steps of a method according to the invention for assembling a hybrid transmission device as per FIGS. 1-4.

The individual steps of the method proceed preferably in the chronological sequence illustrated.

First step, a): The initial state of the electric machine is as follows: a preassembled rotor module 15, comprising: the rotor shaft 2, wherein the pinion 7 may have been cut onto said rotor shaft, the rotor laminated core, which may be fastened to the shaft in the conventional manner by means of interference fit, in the case of a permanent-magnet synchronous machine, the permanent magnet, which may be fastened on or in the rotor laminated core, the rotating part of the resolver ("target"), which may be fastened on the shaft, optionally the second bearing 10.

In addition, preassembled stator module 16, comprising: the stator laminated core, the stator windings, which are embedded into the stator laminated core, wherein the conventional method steps for producing the stator winding (forming of the winding heads, potting with impregnating resin, crimping of the phase terminals etc.) have already been performed, a temperature sensor together with low-voltage connection.

The proposed method comprises the following steps:

Second step, b): The abovementioned preassembled modules 15, 16 are temporarily fitted one inside the other in contact-free fashion, wherein the rotor may be held for example by means of so-called centring pins at both ends such that it can rotate.

The temporarily fitted preassembled modules 15, 16 may be subjected to a series of tests, which include a rotation of the rotor (so-called dynamic motor test) in order to identify faulty parts and remove these from the further assembly process and/or in order to determine important machine parameters that are subject to variance.

Third step, c): After the testing, the two preassembled modules 15, 16 are initially separated again and subsequently paired again in contact-free fashion on a workpiece carrier 17, wherein the rotor is in this case not rotatable. The "marriage" of rotor module 15 and stator module 16 takes place here as follows: The stator module 16 is mounted onto a workpiece carrier 17 that holds and centres the vertically standing stator 1. The workpiece carrier 17 comprises a guide in which an optionally axially movable centring pin is installed. The rotor module 15 is fitted vertically in an axial direction onto the centring pin, which in turn protrudes into the inner contour of the hollow shaft of the rotor. Here, the rotor shaft 2 is designed as a hollow shaft. The rotor and stator can thus be advantageously fitted without dynamic contact of the rotor and stator occurring in the process, which could lead to damage to one of the components.

Fourth step, d): The rotor module 15 and stator module 16 are fitted on the workpiece carrier 17 in contact-free fashion.

Fifth step, e): An intermediate plate 11 is mounted onto the stator 1. This intermediate plate 11 comprises: a shaft stub 12 for receiving the intermediate gear bearing arrangement, and a receptacle for the stator of the resolver 21. Depending on the selected variant (1 or 2), the intermediate plate 11 may furthermore comprise a bearing seat for the first bearing 9 (variant 1). FIG. 4 illustrates variant 2, in which the mounting is realized in the transmission housing 4.

Sixth step, f): The intermediate gear 8 together with its bearing arrangement is fastened on the shaft stub 12.

Seventh step, g): The first bearing 9 is (in the case of variant 2) mounted "behind" (or outside) the pinion 7.

Eighth step, h): The module 15, 16 preassembled on the workpiece carrier 17 is fastened on the transmission workpiece carrier, on which the preassembled gear set of the transmission 3 is present, and the gear chains of the electric machine and transmission 3 are engaged with one another.

Ninth step: The transmission housing 4 is placed manually over the gear set, wherein, inter alia, the first bearing 9 of the electric machine is received in the transmission housing 4 (in variant 2).

Tenth step, i): The clutch housing 6 with the gear set and the electric machine module 15, 16 is rotated such that the open housing half points vertically upward. The workpiece carrier 17 of the electric machine assembly 15, 16 is in this case still fastened to the stator 1 and is rotated conjointly.

Eleventh step, j): The intermediate plate 11 is screw-connected into the transmission housing 4.

For the further procedure, there are now two conceivable methods, hereinafter denoted by I or II, irrespective of whether variant 1 or 2 is implemented:

Method I (illustrated in FIG. 5): The workpiece carrier 17 with the centring pin is dismounted. By virtue of the fact that the second bearing 10 has not yet been installed in the clutch housing 6, the rotor will abut against the stator 1 owing to the magnetic forces. This is however not critical because this takes place in a quasi-steady state (without further relative movement after the abutment occurs).

Method II: Through a bore that is present in any case at a suitable location in the transmission housing 4, the rotor is held by a centring pin that is inserted through said bore into the rotor from below. In FIG. 5, image j), the position and direction of the insertion of the second centring pin is denoted by an upwardly directed vertical arrow.

Both Methods have the following optional step in common: on the second side of the rotor shaft 2, a clamping ring that comprises four screw attachment bosses 19 is attached to the outer diameter of the stator 1. By means of these screw attachment bosses 19 of the clamping ring, or screw attachment bosses 19 directly on the stator 1, the stator 1 is clamped between the screw attachment bosses 19 and the intermediate plate 11.

With regard to the further method, a distinction is again to be made between Method I and Method II:

Method I:

A bore is provided at a suitable location in the clutch housing 6 (see the round marking in step k of FIG. 5). When the clutch housing 6 is lowered onto the transmission housing 4 with the gear set in order to close the transmission (the station used for this is illustrated in image 1 in FIG. 5), a centring pin can again protrude through said bore into the rotor shaft 2, release the latter from the stator 1 and subsequently hold said rotor shaft in a defined position while the clutch housing 6 is connected to the transmission housing 4.

The centring pin is subsequently pulled out, and the opening in the clutch housing 6 is closed.

Method II:

Since the lower centring pin centres the rotor in a defined position, there is no longer a need for an opening in the clutch housing 6 during the fitting of the clutch housing 6 onto the transmission housing 4.

In both methods and variants, it is the case that the clutch housing 6 receives the second bearing 10 (see FIG. 4).

What is claimed is:

1. A hybrid transmission device, comprising an electric machine, wherein the electric machine has an externally situated stator and an internally situated rotor shaft, wherein the hybrid transmission device furthermore comprises a transmission in a transmission housing and a clutch in a clutch housing, wherein the stator is fastened in the transmission housing or in the clutch housing, wherein the rotor shaft has, at a first end, a pinion that meshes with an intermediate gear of the transmission, wherein the rotor shaft is mounted in the region of the first end and in the region of the oppositely situated second end of the rotor shaft by means of a first and a second bearing, characterized in that an intermediate plate is arranged axially in the region of the first end of the rotor shaft, wherein the stator is fastened to the intermediate plate, wherein the second bearing for the mounting of the second end of the rotor shaft is fixed directly in the clutch housing, and the first bearing for the mounting of the first end of the rotor shaft is fixed to the transmission housing or is fixed to the intermediate plate;

wherein the pinion is disposed axially between the first bearing and the second bearing;

wherein the entire axial extent of the pinion is disposed entirely within a recess of the intermediate plate and is fully surrounded by the intermediate plate.

2. The hybrid transmission device according to claim 1, wherein the intermediate gear is mounted on a shaft stub, wherein the shaft stub is formed on the intermediate plate.

3. The hybrid transmission device according to claim 1, wherein the pinion is situated at the first end of the rotor shaft axially between the first bearing and the second bearing, such that the first bearing is situated to the outside of the pinion of the rotor shaft.

4. A hybrid transmission device, comprising an electric machine, wherein the electric machine has an externally situated stator and an internally situated rotor shaft, wherein the hybrid transmission device furthermore comprises a transmission in a transmission housing and a clutch in a clutch housing, wherein the stator is fastened in the transmission housing or in the clutch housing, wherein the rotor shaft has, at a first end, a pinion that meshes with an intermediate gear of the transmission, wherein the rotor shaft is mounted in the region of the first end and in the region of the oppositely situated second end of the rotor shaft by means of a first and a second bearing, characterized in that an intermediate plate is arranged axially in the region of the first end of the rotor shaft, wherein the stator is fastened to the intermediate plate, wherein the second bearing for the mounting of the second end of the rotor shaft is fixed directly in the clutch housing, and the first bearing for the mounting of the first end of the rotor shaft is fixed to the transmission housing or is fixed to the intermediate plate;

wherein the pinion is disposed axially between the first bearing and the second bearing;

wherein the entire axial extent of the pinion is disposed entirely within a recess of the intermediate plate and is fully surrounded by the intermediate plate;

wherein a clamping ring is arranged axially in the region of the second end of the rotor shaft, wherein the stator is clamped between the intermediate plate and the clamping ring, in a manner braced by means of tension bolts, or in that the stator has screw attachment bosses axially in the region of the second end of the rotor shaft, such that the stator is clamped between the intermediate plate and the screw attachment bosses, in a manner braced by means of tension bolts.

5. A method of assembling a hybrid transmission device, the hybrid transmission device comprising:

an electric machine, wherein the electric machine has an externally situated stator and an internally situated rotor shaft, wherein the hybrid transmission device furthermore comprises a transmission in a transmission housing and a clutch in a clutch housing, wherein the stator is fastened in the transmission housing or in the clutch housing, wherein the rotor shaft has, at a first end, a pinion that meshes with an intermediate gear of the transmission, wherein the rotor shaft is mounted in the region of the first end and in the region of the oppositely situated second end of the rotor shaft by means of a first and a second bearing, characterized in that an intermediate plate is arranged axially in the region of the first end of the rotor shaft, wherein the stator is fastened to the intermediate plate, wherein the second bearing for the mounting of the second end of the rotor shaft is fixed directly in the clutch housing, and the first bearing for the mounting of the first end of the rotor shaft is fixed to the transmission housing or is fixed to the intermediate plate;

wherein, firstly, a rotor module that comprises at least the rotor shaft and a rotor laminated core is preassembled, and a stator module that comprises at least one stator laminated core with stator windings is preassembled, wherein the rotor module and the stator module are placed in an axial direction onto a workpiece carrier and are fitted one inside the other in contact-free fashion, wherein the intermediate plate, which comprises the shaft stub for the mounting of the intermediate gear, is mounted on the stator, wherein the rotor module and stator module fitted on the workpiece carrier are assembled with the transmission, wherein the transmission housing is placed over the transmission, and wherein the clutch housing is connected to the transmission housing.

6. The method according to claim 5, wherein, before being placed in an axial direction onto the workpiece carrier and being fitted one inside the other in contact-free fashion, the rotor module and the stator module are already temporarily fitted one inside the other such that the rotor shaft can rotate, and at least one rotation test is performed in order to single out defective parts.

7. The method according to claim 5, wherein, after the transmission housing has been placed over the transmission, the intermediate plate is screwed to the transmission housing.

8. The method according to claim 5, wherein, after the intermediate plate, which comprises the shaft stub for the mounting of the intermediate gear, is mounted on the stator, and before the rotor module and stator module fitted on the workpiece carrier are assembled with the transmission, the intermediate gear is fastened on the shaft stub.

9. The method according to claim 8, wherein, before the rotor module and stator module fitted on the workpiece carrier are assembled with the transmission, after the intermediate gear has been fastened on the shaft stub, the first bearing for the mounting of the first end of the rotor shaft is fastened to the rotor shaft.

10. The method according to claim 5, wherein, before the clutch housing is connected to the transmission housing, after the transmission housing has been placed over the transmission, a clamping ring is attached to the stator axially in the region of the second end of the rotor shaft, wherein the stator is clamped between the intermediate plate and the clamping ring, in a manner braced by means of tension bolts.

11. The method according to claim 5, wherein the intermediate gear is mounted on a shaft stub, wherein the shaft stub is formed on the intermediate plate.

12. The method according to claim 5, wherein the pinion is situated at the first end of the rotor shaft axially between the first bearing and the second bearing, such that the first bearing is situated to the outside of the pinion of the rotor shaft.

13. The method according to claim 5, wherein a clamping ring is arranged axially in the region of the second end of the rotor shaft, wherein the stator is clamped between the intermediate plate and the clamping ring, in a manner braced by means of tension bolts, or in that the stator has screw attachment bosses axially in the region of the second end of the rotor shaft, such that the stator is clamped between the intermediate plate and the screw attachment bosses, in a manner braced by means of tension bolts.

* * * * *